United States Patent [19]

Oberloier

[11] 3,810,405

[45] May 14, 1974

[54] TRIMMING APPARATUS

[76] Inventor: John W. Oberloier, 491 Somerset Rd., Saginaw, Mich. 48603

[22] Filed: June 19, 1972

[21] Appl. No.: 263,847

Related U.S. Application Data

[62] Division of Ser. No. 79,206, Oct. 8, 1970.

[52] U.S. Cl................. 83/100, 83/256, 83/267, 83/411 R, 83/914
[51] Int. Cl............................ B26d 5/10, B26d 7/06
[58] Field of Search ............ 83/100, 267, 255, 256, 83/411 R, 914

[56] References Cited
UNITED STATES PATENTS

| | | | |
|---|---|---|---|
| 996,327 | 6/1911 | Gray, Jr. et al. | 83/256 |
| 3,127,804 | 4/1964 | Bufalino | 83/267 X |
| 3,186,276 | 6/1965 | Thomas et al. | 83/267 X |
| 3,623,385 | 11/1971 | Schneider et al. | 83/267 X |
| 3,677,118 | 7/1972 | Abbott et al. | 83/267 X |

Primary Examiner—Frank T. Yost

[57] ABSTRACT

Apparatus for trimming hollow plastic articles including a turntable for supporting and moving articles positioned thereon in a circumferential path, at least one saw member at a peripherally disposed saw station, mounted on a support arm for swinging movement between radially spaced inoperative and operative cutting positions for removing at least one end portion of the article, a plunge milling member for cutting an aperture in the wall of the article, and a cutting member movable in a generally tangentially path of travel along a plane intersecting said aperture to remove an end portion of the article outwardly of the aperture to provide a cutout in the article.

16 Claims, 10 Drawing Figures

TRIMMING APPARATUS

This is a division, of application Ser. No. 79,206, filed in the United States Patent Office on Oct. 8, 1970.

FIELD OF THE INVENTION

This invention relates to apparatus for trimming articles, and more particularly, to apparatus for performing rapid and accurate cuts on different portions of articles to insure conformity with the precise shape of the device to which the articles are to be attached. More specifically, the invention is particularly directed to apparatus for indexing plastic articles to a plurality of cutting stations where different portions of the articles are severed and removed to remote locations by suction creating mechanism.

BACKGROUND OF THE INVENTION

Increasing labor costs and the demand for increased outputs have rendered prior art methods of manually trimming articles obsolete. It is necessary that mechanized equipment replace operations previously performed by hand. The technological problems associated with machines, which will trim articles requiring only one trimming operation, trim articles having regular shapes, or trim articles which may be trimmed within wide manufacturing tolerances, are minimal. However, to provide apparatus which will rapidly and accurately perform a plurality of cutting operations on irregularly shaped articles within a small tolerance range, has provided a perplexing problem, not solved by the prior art.

Accordingly, it is an object of the present invention to provide a trimming machine which will accomplish multiple cutting operations on irregularly shaped objects that must be trimmed within a small tolerance range.

It is another object of the present invention to provide a rotary machine which will perform a series of cutting operations on different portions of plastic articles.

It is still another object of the present invention to provide new and novel apparatus for cutting a cutout in the end face of a hollow article to insure conformity with the device to which the article is to be attached.

It is yet another object of the present invention to provide a new and improved scrap removal system for a rotary article trimming apparatus.

A further object of the present invention is to provide cutting apparatus which can be moved in any plane to provide fine adjustment of the cutting apparatus.

Other objects and advantages of the present invention will become apparent to those of ordinary skill in the art as the description thereof proceeds.

SUMMARY OF THE INVENTION

Apparatus for trimming objects, such as hollow plastic articles, comprising a rotary turntable having a series of circumferentially spaced object support means thereon movable in a circumferential path of travel when the turntable is rotated, a plurality of cutting means circumferentially displaced about the turntable at a plurality of cutting stations for severing different portions of the objects as the objects are moved thereto when the turntable is rotated, means for intermittently indexing the turntable to sequentially position the objects at the circumferentially displaced cutting stations and temporarily holding the turntable stationary while the objects are being cut, and means for moving said cutting means in generally tangential paths of travel relative to the circumferential path of travel to cut different portions of said objects at the respective cutting stations, when the turntable is stationary.

The present invention may be more readily be described by reference to the accompanying drawings, in which.

THE ARTICLE

Figures 3, 4, 5, 6, 7:
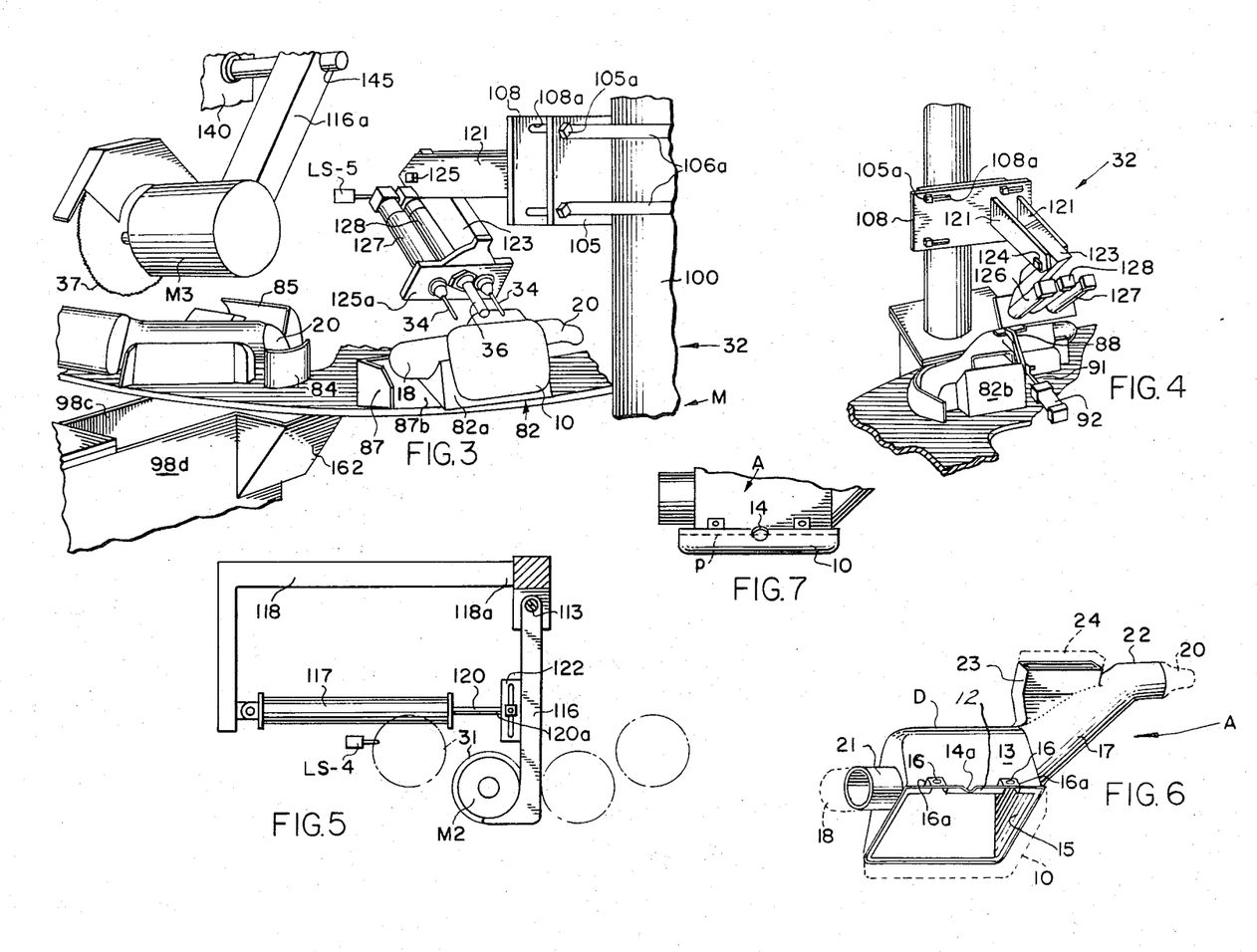
FIG. 3 is an enlarged, fragmentary, rear, perspective view particularly illustrating the apparatus at the drill and plunge milling station and a portion of the apparatus at the adjacent saw station.
FIG. 4 is an enlarged, fragmentary, front, perspective view particularly illustrating the apparatus at the drill and plunge milling station.
FIG. 5 is a sectional view, taken along the line 5—5 of FIG. 2, illustrating one of the swingable support arms for the tangentially movable saws.
FIG. 6 is an enlarged perspective view illustrating an object to be trimmed with the finished article being illustrated in solid lines and the portions of the object to be severed illustrated in chain lines.
FIG. 7 is an enlarged, fragmentary top plan view of an object to be trimmed and particularly illustrating the path taken by the tangentially movable saw member at the final saw station, through the aperture cut in the article at the plunge milling station.

The apparatus constructed according to the present invention is particularly adapted for trimming a hollow, blow molded, synthetic plastic article, illustrated generally in solid and chain lines at A in FIG. 6, to form an air manifold duct D, illustrated in solid lines, for an automobile heater (not shown). The manifold duct D includes a main body portion 13 having an end face 12 surrounding an opening 15 which is exposed when the portion 10 of the article A has been severed. The end face 12 is adapted to be mounted on an automobile heater duct (not shown) to provide heated air to the opening 15. Communicating with one side of the main body portion 13 is a conduit 21 which is adapted to have a heater hose (not shown) clamped thereto, after the portion 18 is removed, for communicating heated air to the driver side of an automobile.

The article A includes an angularly extending leg portion 17 communicating with the opposite side of the main body 13 and terminating in an end portion 22 which is adapted to be connected with a heater hose (not shown) after the portion 20 is removed, for communicating heated air to the passenger side of the automobile. The angularly extending leg portion 17 also includes a portion 23 adapted to be connected with conventional air ducts (not shown), which direct air to the automobile window defrosters (not shown), after the portion 24 is severed therefrom. Before the portion 10 is severed, an aperture 14 (FIG. 7) is cut into the upper wall of the article A. After the portion 10 is removed, the remaining cutout 14a in the end face 12 is particularly adapted to mate with complementally formed portions of the automobile heater duct (not shown). Holes 16 are also tapped into increased thickness portions 16a for receiving bolts which connect the duct D to the automobile heater duct (not shown).

GENERAL DESCRIPTION

Figure 1:
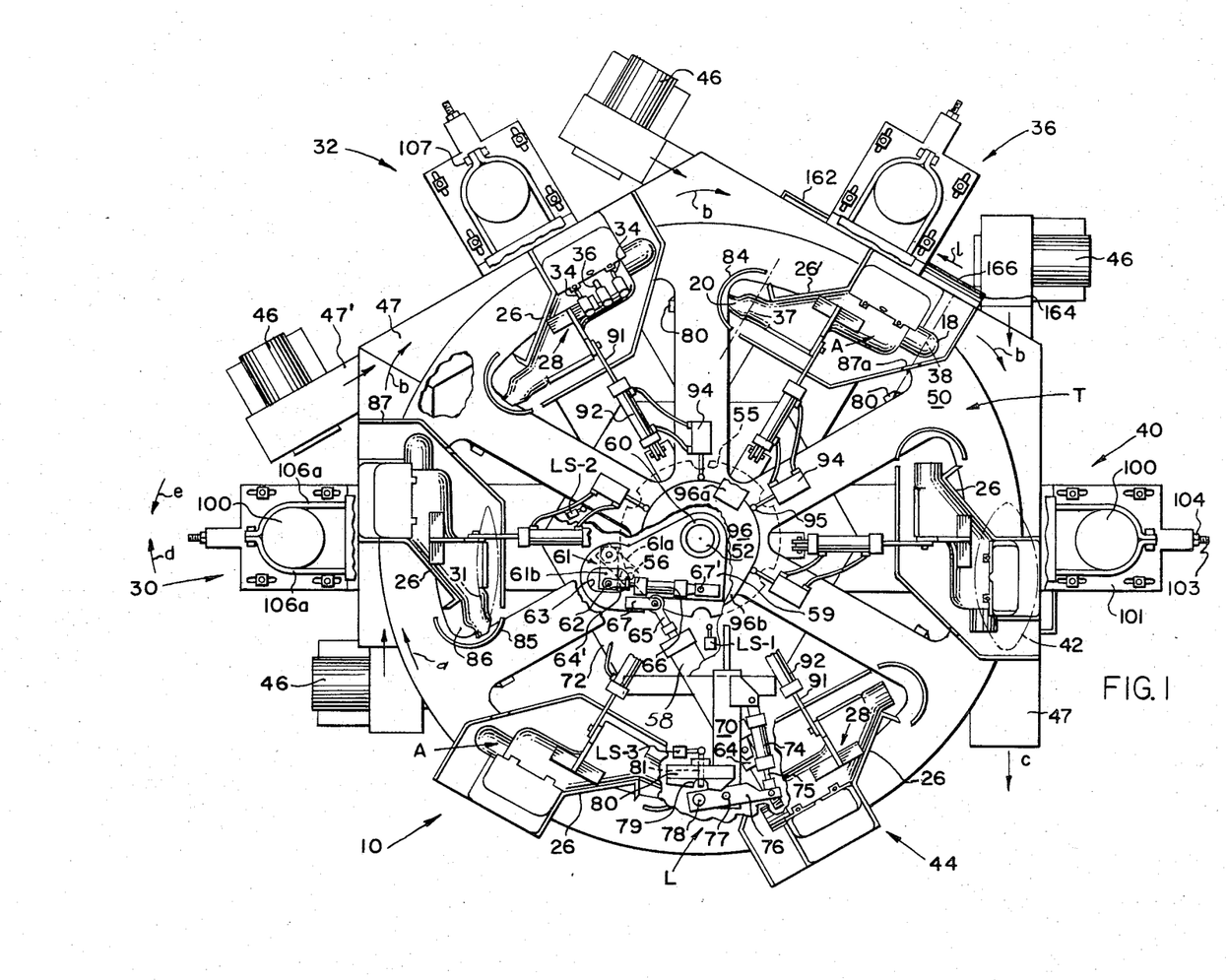
FIG. 1 is a fragmentary, top plan view of the trimming apparatus formed according to the invention, parts being broken away to more clearly illustrate certain portions thereof.

Apparatus formed according to the present invention includes a turntable T supported on a frame F and mounting six article support holders 26 for movement in a clockwise direction, as indicated by the arrow a in FIG. 1, in a generally circumferential path of travel. Articles A are successively manually loaded on the support holders 26 at a loading station generally designated 10. As the turntable rotates in the direction of the arrow a, toward the first cutting station 30, workpiece holding clamps, generally shown at 28, fixedly clamp the articles A to the support holders 26. After an article A is moved to the first cutting station 30, a saw, schematically illustrated at 31 in FIG. 1, moves in a generally tangential path relative to the circumferential path of travel to sever the portion 24 from the duct 23. The turntable is again indexed to move the article A from the station 30 to a drill and plunge milling station 32 where a pair of spaced drills, schematically illustrated at 34, and a milling tool, schematically illustrated at 36, provide the holes 16 and 14 respectively in one wall of the article A.

The article A is then indexed to the station 36 where a pair of saw members, schematically illustrated at 37 and 38 in FIG. 1, are swung between radially inner and outer positions to sever the opposite end portions 20 and 18 respectively from the article A. It should be noted that when the article A is positioned on the workpiece holder 26, the end portion 18 is located radially outwardly of the end portion 20. The article A is then indexed from the station 36 to the final cutting station 40 where a saw member, schematically illustrated at 42, is swung in a generally tangential path along a plane p (FIG. 7) intersecting the aperture 14 to remove the portion 10 from the article A. The table is then indexed to an unloading station 44 where the finished part is manually removed after the clamp 28 is swung to the unclamped position. A suction creating mechanism is provided for removing severed scrap material and includes a plurality of fans 46 communicating with a hollow cylindrical duct 47 extending in a U-shaped path to move the severed material in the direction, indicated by the arrow b, to a blow molding station, generally indicated by the arrow c.

TURNTABLE AND INDEXING MECHANISM

The turntable T includes a circular, spoked disc 50 supported on a center shaft 52 journaled for rotation in bearings 53. Fixed to the shaft 52 beneath the plate 50 is an actuator plate 54 including a plurality of circumferentially spaced notches 55 about the periphery thereof adapted to receive a pawl 56, as will presently be described.

For supporting a fluid operating solenoid actuated, spring returned cylinder 66, which moves the pawl 56 into and out of engagement with the notches 55, a mounting plate 59 is mounted for pivotal movement on the shaft 52 by bearings 60. A bell crank 61 is pivotally mounted on a pin 62 depending from the plate 59 and mounts the pawl 56 on one leg 61a and a pin 62 at the terminal end of the other leg 61b. The pin 62 extends upwardly through an elongated aperture 63 formed in the plate 59 and is connected with the piston rod 64' of the cylinder 66 pivotally mounted on the plate 59 by a pivot pin 67'. When the solenoid 66a (FIG. 10) is actuated, the piston rod 64' swings the bell crank 61 counterclockwisely to move the pawl 56 into engagement with one of the notches 55. The elongated slot 63 permits the pin 62 to freely move forth and back as the pawl 56 moves into and out of engagement with the notches 55.

For indexing the pawl 56 after it has been moved into engagement with one of the notches 55, a fluid operating, solenoid actuated, spring returned cylinder 58 is mounted on a frame supported bracket 64 and includes a piston rod 65 pivotally connected with a bracket 67 fixed to the plate 59. A solenoid 58a (line 11, FIG. 10) is provided for directing fluid to cylinder 58 such that the piston 56 is extended outwardly sufficiently to index the turntable T so that the articles A on the workpiece holders 26 are all indexed circumferentially to the next station.

To insure that the articles A are halted in the identical positions at each work station each time the turntable T is indexed, prior to the commencement of any trimming operations, a locking mechanism, illustrated generally at L, is provided and includes a frame bracket 70 supported between the load and unload station 10 and 44 on a hexagonally shaped, vertically extending, tubular support post 72 surrounding the shaft 52. The support post 72 mounts a solenoid actuated, fluid operating, spring returned cylinder 74 which includes a piston rod 75 that is extended when a solenoid 74a (see line L10 FIG. 10) is energized. The piston rod 75 is connected with one end of an arm 76 pivotally mounted on the bracket 70 with a pin 77. The opposite end of the arm 76 includes an actuating pin 78 which is received in one of the notches 79 cut into a plurality of circumferentially displaced brackets 80 fixed to the underside of the disc 50. A horizontal pin 81 extends into each of the notches 79 and is biased to the radially outer positions with a spring (not shown). Prior to the commencement of any trimming operations, a solenoid 74a (FIG. 10) is energized to extend the piston 75 so that the pin 78 enters the notch 79 and moves the pin 81 radially inwardly, into engagement with the actuating arm of a limit switch LS-3 mounted on the bracket 70 with suitable mount members (not shown). Before the solenoid 74a of the cylinder 74 can be actuated, a limit switch LS-1, stationarily mounted in the path of portions 50b depending from the turntable T, must be actuated by one of the portions 50b when the turntable is indexed to a position such that the workpieces are precisely positioned at the work stations. A third limit switch LS-2 is also stationarily mounted on the post 72 for a purpose to be described hereinafter in the description of the operation.

WORKPIECE HOLDERS AND CLAMP MECHANISMS

As best illustrated in FIG. 3, the workpiece holders 26 each include a main body portion 82 having an upper surface generally conforming to the shape of the underside of the article A. When an article A is positioned on a holder 26, the front and rear edge portions 82a and 82b extend radially inwardly and outwardly of the portions 10 and 24 respectively, to permit the free passage of the saw members 31 and 42 respectively, through the upper and lower walls of an article. One side of the workpiece holders 26, having a guard 87, is provided with a kerf 87a for permitting the passage of the saw blade 38 as it is swung in a cutting path as will be described more fully hereinafter. The member 87 includes an upper sloped surface 87b for permitting the severed parts 18 to slide downwardly into the vacuum exhaust system which will be also described more fully hereinafter.

Figure 2:
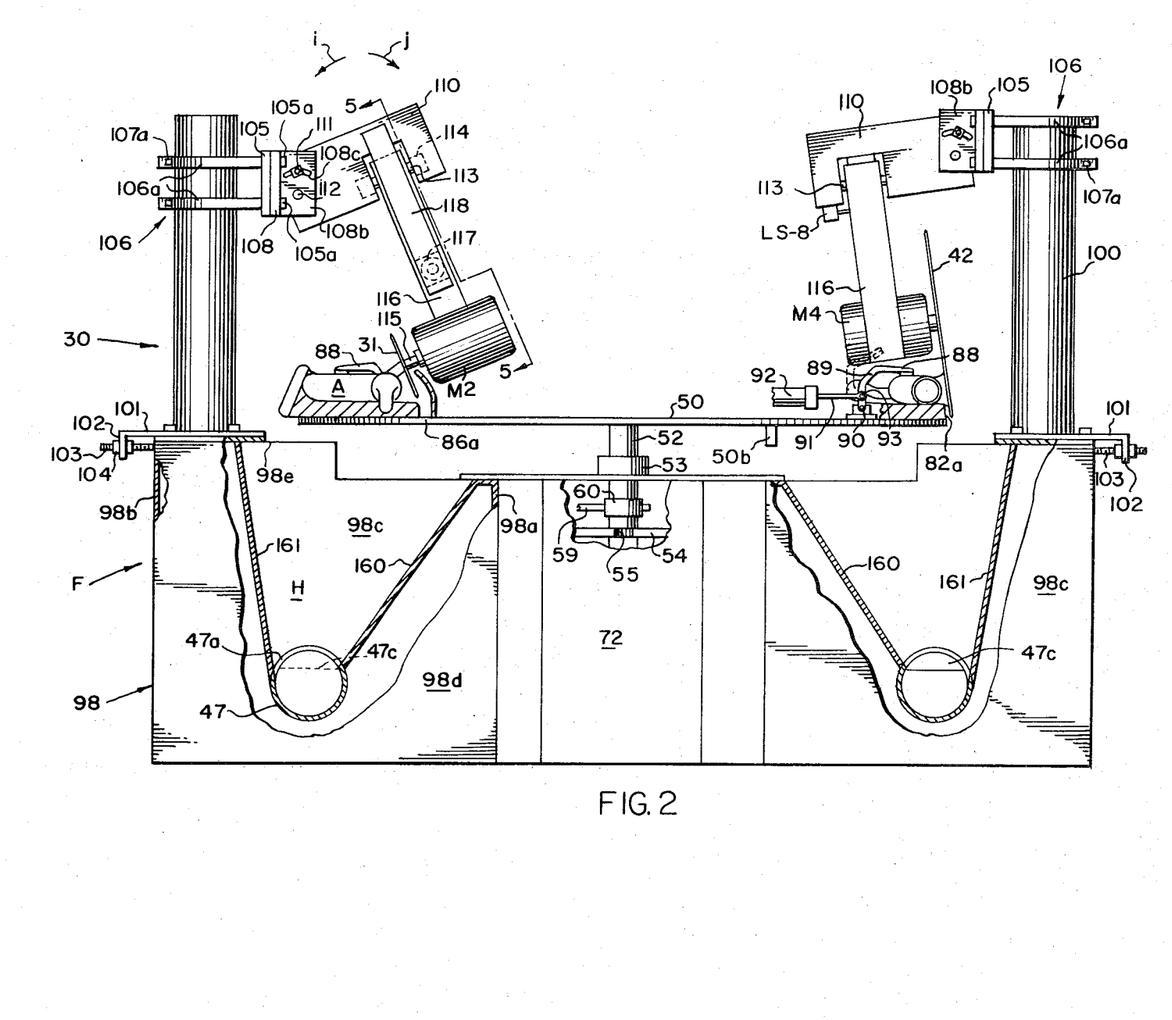
FIG. 2 is a fragmentary, front elevational view of the apparatus of FIG. 1, and particularly illustrating the two tangentially movable saw mechanisms and one of the clamps for securing an article to a support member, parts being broken away in section to illustrate the scrap removal ducts.

Referring now particularly to FIG. 2, the clamp members 28 each include an article engaging clamp member 88 constructed to conform to a portion of the upper surface of the article A and being mounted on an actuator arm 89 which is pivotally connected to the turntable 50 by a pin 90. For moving the clamp 88 between the clamping position, illustrated in solid lines in FIG. 2, and the unclamped position, illustrated in chain lines in FIG. 2, a fluid operated, solenoid actuated, double acting cylinder 92 is mounted on the turntable 50 adjacent each work holder 26 and includes a piston rod 91 pivotally connected with a pin 93 on the arm 89.

A valve 94 (FIG. 1) is associated with each cylinder 92 and includes a follower roller 95 riding on a cam 96 which is fixed to the frame F above the turntable T in any suitable manner such as with a mounting flange 96a. As the follower roller 95 engages the lobe 96b of the cam 96, the valve 94 is actuated to direct fluid to the cylinder 92 in such direction as to move the associated clamp 88 from the solid line clamping position illustrated in FIG. 2 to the chain line unclamped position also illustrated in FIG. 2. After the work holder 26 is moved from the loading station 10, the follower roller 95 escapes the lobe 96b and permits the valve 94 and clamp 88 to return to their original clamping positions.

FIRST AND FINAL SAW STATIONS

Referring now more particularly to FIGS. 2 and 5, the first saw station 30 includes mounting mechanism, generally designated M, comprising a hollow, rectangularly shaped base housing member 98 having radially inner and outer end walls 98a and 98b and a pair of side walls 98c and 98d (see FIG. 3). A partial top wall 98e spans the side walls 98c and 98d. A vertically extending support post 100 is mounted on a slide plate 101 slidably supported on the upper wall 98e. The plate 101 includes a vertical flange portion 102 receiving a screw 103 which threadedly receives a pair of nuts 104 on opposite sides of the flange 103. By adjusting the position of the nuts 104, the radial position of the vertically extending support post 100 is controlled.

A support plate 105 is adjustably mounted on the vertical post 100 with a pair of split ring clamp members 106 having split half portions 106a (FIG. 1), removably connected to each other with bolts 107 and nuts 107a. When the bolts 107 are unthreaded from the nuts 107a, the respective halves 106a of the clamps 106 may be moved vertically or swung about the post 100 in the directions indicated by the arrows d and e (FIG. 1).

Adjustably clamped to the plate 105 with bolts 105a threaded in the plate 105, is an L-shaped mounting bracket 108 having horizontal slots 108a (see FIG. 4) therein for receiving the bolts 105a. By loosening the bolts 105a, the horizontal position of the plate 108 relative to the bracket 106 may be adjusted. As will be pointed out more particularly hereinafter, the apparatus described up to this point at the first cutting station is also provided at each of the remaining stations 32, 36 and 40.

The leg 108b of the bracket 108, at station 30, pivotally mounts an inverted U-shaped bracket 110 on a bolt 112 threaded into the bracket 110. The angular position of the bracket 110, in the direction of the arrows i and j (FIG. 2), is controlled by a bolt 111 passing through an arcuate slot 108c in the leg 108b and threaded into the bracket 110. The vertically and rotatably adjustable clamps 106, the adjustable brackets 108 and 110, and the radially adjustable posts 100 provide a substantially universal mounting for the motor M2 to permit the saw 31 to be positioned in any predetermined location for cutting any portion of the article A. Corresponding mechanism is provided at each of the remaining work stations for universally mounting each of the cutting mechanisms.

A rock shaft 113 is journaled in bearings 114 provided in the legs of the U-shaped bracket 110 and mounts a workpiece support arm 116 (FIG. 5). Mounted on the terminal end of the arm 116 at the station 30 is an electrically operated motor M2 including an output shaft 115 having the circular saw 31 fixed to its outer end.

For moving the arm 116 mounting the motor M2 and saw 31 in a swinging path of travel (FIG. 5) from a removed inoperative position into article cutting position, a fluid operated, solenoid actuated, double acting cylinder 117 is mounted on a support arm 118 fixed at its forward end 118a to the U-shaped bracket 110. The cylinder 117 includes a piston rod 120 having its terminal end 120a slidably received in a slotted bracket 122 secured to the arm 116.

The apparatus at the final saw station 40 is constructed identically to the apparatus at the first saw station 30 with the exception of the relative positions of the brackets 108 and the bracket 110 mounting the saw motor M4. Also, the diameter of the circular saw 42 is larger than that of the circular saw 31. The saw 42 is positioned to remove the end face 10 as illustrated in FIG. 2.

DRILL AND PLUNGE MILLING STATION

Referring now particularly to FIGS. 3 and 4, the drill and plunge milling station 32 includes mounting mechanism M which is constructed identically to the mechanism M described hereinbefore at station 30, and comprises a hollow base housing member 98 and a vertically extending support post 32 mounting a support bracket 105. A pair of generally radially inwardly extending mounting brackets 121 are fixed to the plate 108 at the station 32 in any suitable manner such as by welding, and support a drill mounting block 123 therebetween with a bolt 124 and nut 125. Depending from the lower portion of the mounting block 123 is a plate 125a mounting a pair of drill assemblies 126 and 127 and a plunge milling assembly 128. The drill assemblies 126 and 127 and the plunge milling assembly 128 include conventional air motors for rotatably driving the drills 34 and milling tool 36 respectively. The drill assemblies 126 and 127 and plunge milling assembly 128 include solenoid actuated, pneumatically controlled, double acting cylinders which operate to move the drills 34 and plunge milling member 36 between the positions shown at FIG. 3 and operative cutting positions in engagement with the piece for cutting the holes 16 and 14 in the workpiece A. The solenoids for actuating the cylinders for moving the drill assemblies 126 and 127 and the plunge milling members 128 inwardly and outwardly, respectively, are designated with characters corresponding to the associated assembly followed by the letter a and b subscripts respectively (see FIG. 10). Drill assemblies, such as type 8255 and 8258, manufactured by the Aro Corporation, Bryan, Ohio, have been found suitable for this purpose.

PLURAL SAW STATION

Figure 8:
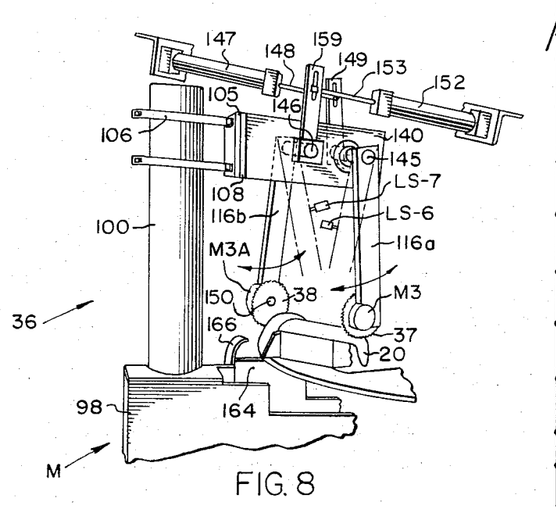
FIG. 8 is a fragmentary, side perspective view of the apparatus at the second cutting station for severing opposite ends of an article.
Figure 9:
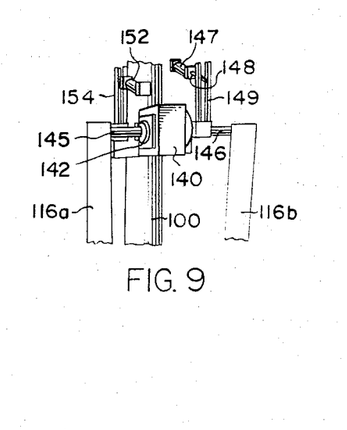
FIG. 9 is a fragmentary, front perspective view particularly illustrating the apparatus at the second cutting station.

Referring now more particularly to FIGS. 3, 8 and 9, a support mechanism M identical, to the support mechanism M at the station 30, is provided and includes another hollow rectangularly shaped housing 98, another vertically extending post 100 mounting another bracket 105 with another pair of clamps 106. Fixed to the plate 108 supported on the bracket 105 at the station 36 is a bearing housing 140 including bearings 142 journaling a pair horizontally extending rock shafts 145 and 146. Fixed to one end of the shaft 145 is a motor supporting arm 116a which mounts the electrical motor M3 that drives the circular saw 37 for severing the portion 20 from each article A. The motor driven saw 37 supported on the arm 116a is movable between the inoperative position, illustrated in chain lines in FIG. 8, and the operative cutting position, illustrated in solid lines in FIG. 8, by a fluid operated solenoid actuated, double acting cylinder 147, mounted on the frame F in any suitable manner. The cylinder 147 includes a piston rod 148 connected to an upwardly extending actuator arm 149 fixed to the opposite end of the rock shaft 145. When the solenoid 147a (FIG. 10) is energized, the piston rod 148 is retracted to the position shown in FIG. 8 whereas when the solenoid 147b (FIG. 10) is energized, the arm 116a is moved to the chain line position illustrated in FIG. 8.

Fixed to the end of the rock shaft 146 adjacent the actuating arm 149 is a motor mounting arm 116b which mounts the motor M3A including an output shaft 150 for driving the circular saw 38. The motor M3A is driven between the inoperative chain line position illustrated in FIG. 8 and the operative cutting position, illustrated in solid lines in FIG. 8, for severing the end portion 18 of each article A, by a cylinder 152 mounted on the frame F in any suitable manner. The cylinder 152 includes a piston rod 153 connected with an actuator arm 154 fixed to the opposite end of the rock shaft 146. When the solenoid 152a (FIG. 10) is energized, the piston rod 153 is retracted to swing the circular saw 38 from the chain line position illustrated in FIG. 8 to the solid line position illustrated in FIG. 8. When the solenoid 152b (FIG. 11) is energized, the saw 38 is returned to the chain line position. It should be noted that when the circular saws 37 and 38 are in the chain line position, they are in substantially the same radial position. When the solenoids 147a and 152a are actuated, the saw member 37 is swung radially inwardly whereas the saw member 38 is swung radially outwardly to simultaneously sever the opposite end portions 20 and 18 respectively.

THE SCRAP SYSTEM

If the severed portions 10, 18, 20 and 24 were permitted to remain at the various work stations 30, 32, 36 and 40, the portions would interfere with the rotation of the turntable and the movement of the cutting members. If the severed scrap material is returned to the blow molding apparatus which molds the articles A, substantial savings in material can be effected. When the cutting members 31, 37, 38, 32 sever the portions 24, 18, 20, and 10, respectively, from the article A, the severed portions will frequently be propelled at a high velocity by the cutting members. The propelled severed portions can not only endanger the operator but may also impede the operation by obstructing the movement of the various moving parts. Guards 84 and 85 are positioned on the turntable adjacent the workpiece holders 26 for preventing the portions 20 and 24, when severed, from being propelled outwardly. The severed portions 20 and 24 are deflected downwardly through apertures 86 and 86a in the turntable T.

The hollow rectangularly shaped housing 98 at each work station includes a pair of oppositely inclined, upwardly extending chutes 160 and 161 spanning the side walls 98c and 98d and terminating at their upper ends at the upper wall 98e and at their lower ends in an opening 47a cut into the upper portion of the U-shaped duct 47 which extends through the side walls 98c and 98d of the housings 98. The chutes 160 and 161, and the walls 98c and 98d cooperate to define a vacuum or suction creating chamber H which draws the severed portions of the articles A downwardly when a vacuum or suction is created in the discharge duct 47. When the saw member 31 severs the portion 24 from the article A, it passes through the aperture 86 in the turntable disc 50 through the opening in the top wall of the rectangular housing 98 and then into the suction creating chamber H where it passes along the chute 160 into the air-duct 47.

As illustrated in FIG. 3, a sidewisely extending partial chute 162 communicates with the suction chamber H and extends outwardly of the wall 98d at the station 36 for deflecting the severed portions 20 which pass through the apertures 86, in the turntable disc 50, into the suction creating chamber H.

On the opposite side wall 98c at the saw station 36, another chute 164 (FIGS. 1 and 3) communicates with the suction creating chamber H and extends outwardly of the wall 98c for deflecting the severed portions 18 in the direction of the arrow l (FIG. 1) into the suction creating chamber 98 where they will pass downwardly along the chute 161 into the duct 47. As illustrated in FIG. 8, a deflector guard 166 is provided on the outer wall of the chute 164 for interrupting any severed portions 18 which may be propelled radially outwardly and deflecting them downwardly into the chute 164.

At the final cutting station 40, the severed portions 10 merely pass into the vacuum creating chamber H through the open upper wall of the rectangular hollow housing 98 and then into the discharge duct 47.

Upstream of the station 30 and downstream of each of the stations 30, 32, and 36, an electrically operable fan mechanism, generally designated 36, is connected with the duct 47 by a duct portion 47' for providing the necessary suction in the duct 47 to propel the severed articles in the direction of the arrow *b* in a U-shaped path to the blow molding apparatus, designated generally by the arrow *c*. Slightly upstream of each opening 47a in the duct 47, a baffle 47c is provided and is directed downwardly in a forward direction so as to reduce the cross-sectional area of the duct 47 to create a venturi effect at each station creating chamber H.

ELECTRICAL CONTROL CIRCUIT

Figure 10:
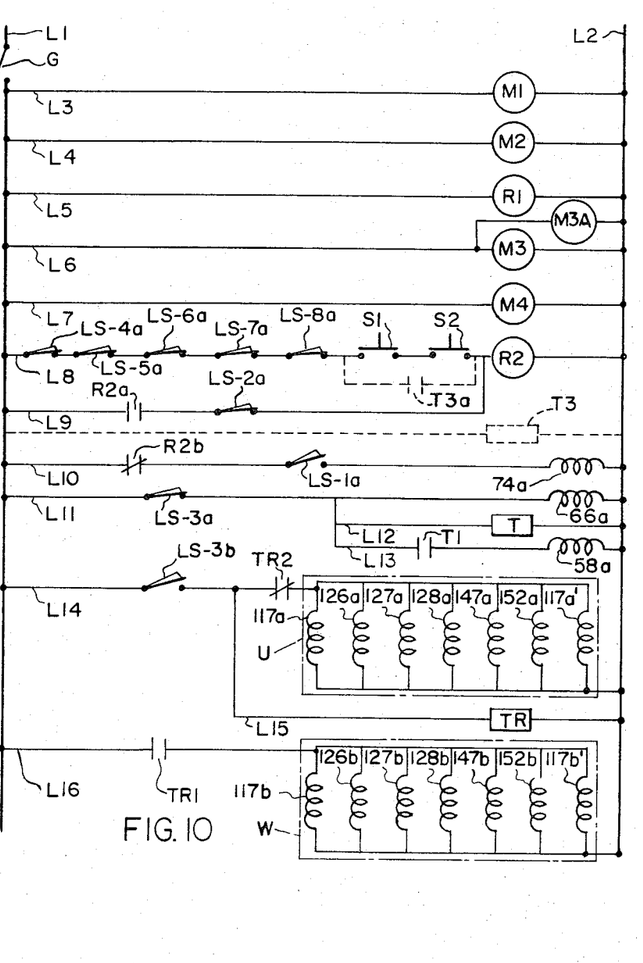
FIG. 10 is an electrical control circuit for controlling the operation of the apparatus illustrated in FIGS. 1–5, 8 and 9.

Referring now more particularly to FIG. 10, an electrical control circuit for operating the trimming machine is illustrated and includes a pair of lines L1 and L2 connected to a suitable source of power such as 110 V, 60 cycle, alternating current. A main power switch G is connected in line L1 for electrically disabling the entire circuit. The armatures of the four electrically operable blower motors for driving the fans 46 which create the suction to remove the severed scrap are schematically illustrated at M1 (line L3) connected across the lines L1 and L2. The armatures of the electrical motors M2 and M4 for rotatably driving the saws 31 and 32 at the first and final saw stations 30 and 40 have their armatures connected across the lines L1 and L2 in lines L4 and L7 respectively. The relay for supplying the drill and plunge milling members 126, 127 and 128 with operating air for driving their air operated motors is designated R1 connected in line L5 across the input lines L1 and L2. The armatures of the motors M3 and M3a for rotatably driving the saw members 37 and 38 respectively at the plural saw station 36 are connected in parallel with each other, in line L6, across the input lines L1 and L2.

At the work stations 30, 32, 36 and 40, safety limit switches LS4, LS5, LS6, LS7 and LS8 respectively are provided for insuring that all of the cutting tools are returned to their raised positions before the turntable T is unlocked to permit its rotation. Before the turntable T can be rotated, a pair of palm operated safety switches *s*1 and *s*2, connected in series in line L8, must be simultaneously actuated by the operator. The mechanisms for actuating the switches are spaced sufficiently so that the operator cannot simultaneously actuate both switches with one hand. The limit switches LS4, LS5, LS6, LS7 and LS8 are operable to open normally closed limit switch contacts LS4a, LS5a, LS6a, LS7a and LS8a respectively when the cutting tools at the respective cutting stations are not in the fully retracted positions. These limit switch contacts LS4a, LS5a, LS6a, LS7a and LS8a are connected in series in line L8 with the hand-operated contacts *s*1 and *s*2 and the control relay R2, which, when energized, is operable to close and open normally open and closed sets of contacts R2a and R2b, respectively. The holding contacts R2a are connected in line L9 with the normally closed limit switch contacts LS2a which open when the cylinder 58 has been operated sufficiently to index the turntable one step to move the workpiece holders 26 and the workpieces thereon to the next adjacent work station. The limit switch LS2 is positioned in the path of the support plate 59.

The limit switch LS1 is positioned on the frame 72 so as to be interrupted by one of the paddles 50b (FIG. 2) depending from the turntable disc 50 when the workpiece holders 26 exactly position the workpieces A at the various work stations. The contacts R2b (line L10) are connected in series with the normally open limit switch contacts LS1a which are closed when the limit switch LS1 is actuated, to energize the table lock solenoid 74a for moving the piston 75 of the table locking cylinder 74 in a direction to swing the pin 78 into one of the lock receiving recesses 79.

When the pin 78 enters one of the notches 79, the pin 81 is moved into engagement with the limit switch LS3 to open the normally closed contacts LS3a in line L11 connected in series circuit with the solenoid 66a of the cylinder 66 which, when energized, pivots the bell crank 61 in a direction to move the pawl 56 into engagement with one of the notches 55 on the table indexing plate 54. If the turntable T is not exactly positioned to permit the pin 78 to enter one of the notches 79, the cutting tools will not be lowered into cutting positions. When the pin 78 is later swung out of the notches 79, the limit switch contacts LS3a will close and the solenoid 66a will be energized. At the same time, the timer T which is connected in parallel with the solenoid 66a, (line L12) is energized to close a set of timer contacts T1 (line L13) shortly thereafter. When the timer contacts T1 close, the table advance solenoid 58a, connected in series therewith across the solenoid 66a is energized to advance the piston rod 66 to index the work holder members 26 and the workpieces thereon clockwisely in the direction of the arrow *a* to the next station. If desired, switch contacts (not shown) could be inserted in series circuit with each of the motors M1 – M4, and the relay R1 to periodically deenergize the motors and relays after each cutting operation.

When the limit switch LS-3 is actuated, a set of normally open contacts LS3b (line L14) are closed to energize a group U of parallelly connected advance solenoids 117a, 126a, 127a, 128a, 147a, 152a, and 117'a connected in series therewith and a set of normally closed lower contacts TR2 for simultaneously energizing the cylinders 117, 126, 127, 128, 147, 152, and 117' for simultaneously lowering the saw members 31, 37, 38, and 42 and the drills 34 and plunge milling member 36 into engagement with the workpieces positioned at their respective work stations. At the same time, the timer TR (line L15) which is connected in parallel with the group U of solenoids is energized. After sufficient time has elapsed for all cutting operations to be completed, the timer TR "times out" and opens the set of normally closed contacts TR2 to deenergize the group U of advance solenoids. At the same time that the contacts TR2 open, the normally open timer contacts TR1 (line L16) close to simultaneously energize a group W of parallelly connected retract solenoids 117b, 126b, 127b, 128b, 147b, 152b and 117'b connected in series therewith for simultaneously returning the cutting members to their starting positions.

Illustrated in chain lines in FIG. 10 is a timer T3 connected across the lines L1 and L2 and including a set of timer contacts T3a connected in parallel with the palm operated contacts *s*1 and *s*2. If the timer T3 and contacts T3a are connected in the circuit, the contacts T3a will periodically close and the circuit will automatically continually index the machine. It should be realized that the timer TR could be replaced with limit switches which are actuated after the respective cutting members have completed their cutting operations.

THE OPERATION

The operation will be described with particular reference to the electrical control circuit illustrated in FIG. 10. The sequence of cutting operations on one article will be described although it should be understood that other articles are being simultaneously cut at the other stations. The machine is started by closing the starter switch G to energize the scrap blower motor M1, the saw turning motors M2, M3 and M4, and the relay R1 for supplying air for driving the air motors at the drill and plunge milling station. After the operator has placed an article A on a workholder 26 at the load station 10, he manually closes the contacts s1 and s2 to energize the control relay R2 (line L8). This opens the normally closed contacts R2b (line L10) to deenergize the table lock solenoid 74a so that the piston rod 75 is retracted and withdraws the pin 78 from the notch 79. When the pin 78 moves out of the notched portion 79 to the position illustrated in FIG. 1, the spring actuated pin 81 relieves the pressure on the limit switch LS3 to open the contacts LS3b in line L14 and close the contacts LS3a in line L11 to initially actuate the solenoid 66a for moving the pawl 56 into one of the notches 55. A short time thereafter (i.e., 1 second) the timer T (line L5) closes the contacts T1 (line L13) to energize the solenoid 58a so that the cylinder 58 indexes the workpiece holder 26 and the article thereon from the station 10 to the station 30. When the piston rod 66 reaches the full extent of its advanced position, the limit switch LS2 is actuated to open the normally closed contacts LS2a (line L9) and deenergize the table unlock relay R2. This permits the contact R2b (line L10) to return to the closed position to energize the table lock solenoid 74a connected in series circuit therewith and swing the pin 78 into the following notch 79. The contacts LS1a are closed at this time, because the workpiece holder 26 is now positioned exactly at the work station 30. When the pin 78 is moved into the notch 79, the contacts LS3b (line L14) close to energize the group U of advance solenoids including the solenoid 117a which is operable to swing the saw 31 counterclockwisely, as illustrated in FIG. 5. After a sufficient time for the saw to have severed the portion 24, the timer contacts (line L14) close to deenergize the group U of advance solenoids. The timer contacts TR1 (line L16) also close to energize the retract solenoid 117b for returning the saw 31 to its starting position. The severed portion 24 is deflected by the shield 85 into the suction creating chamber H and then passes the duct 47.

The operator then loads a workpiece on the succeeding workpiece holder 26 at the loading station 10 and again presses the contacts s1 and s2 to move the workpiece at the station 30 to the station 32 to again actuate the limit switch LS1 and lock the turntable T in position. This deenergizes the limit switch LS3 so that the contacts LS3b (line L14) close to energize the solenoids 126a, 127a and 128a for advancing the drills 34 and plunge milling member 36 into engagement with the part A for cutting apertures 16 and 14 respectively in the part A. After the timer contacts TR1 close, the retract solenoids 126b, 127b and 128b are energized to retract the drill and plunge milling member 34 and 36 to their starting positions. After the operator has loaded a third workpiece on the third work holder 26, he again closes the contacts s1 and s2 and the workpiece at the load station 32 is advanced to plural saw station 36 to again actuate the limit switch LS1 and close the contacts LS1a to lock the turntable T. After the contacts LS3b close when the limit switch LS3 is actuated, the solenoids 147a and 152a are energized to radially swing the saw members 37 and 38 in opposite directions toward and away from each other into positions for simultaneously trimming the end portions 18 and 20 which pass through the vacuum suction chamber H and the duct 47 at the station 36. After the timer contacts TR1 close, the solenoids 147b and 152b are energized to retract the saw members 37 and 38 to their starting positions.

After the operator has loaded the fourth article on the fourth work holder 26, he again closes the contacts s1 and s2 to advance the workpiece positioned at the saw station 36 to the final cutting station 40. When the limit switch LS1 is actuated, the contacts LS1a again close to energize the solenoid 74a (line L10) to lock the turntable T in position. When the pin 78 is moved into the notch 79, the limit switch LS3 is actuated and the solenoid 117'a is energized to move the saw member 42 in a generally tangentially path along a plane p intersecting the aperture 14 to remove the portion 10 which falls through the aperture 99b to the suction creating chamber H and thence into the duct 47 at the station 40. After the timer contacts TR1 are again closed, the solenoid 117'b is energized to retract the saw member 42 to its starting position. After the operator has loaded the fifth workpiece on the fifth work holder 26, and closes the contacts s1 and s2, the turntable T indexes the article A from the final saw station 40 to the unloading station 44. During this final movement, the follower roller 95 engages the cam lobe 96b to move the clamp 28 from the solid position shown in FIG. 2 to the chain line position shown in FIG. 2 so that the operator may quickly remove the finished article from the work holder 26. After he has placed a sixth article on the sixth work holder 26, he again closes the contacts s1 and s2 and the turntable T indexes the work holders to the next station so that the operator may place another unfinished workpiece on the workpiece holder 26 and the operation may continue to be repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for trimming objects, such as hollow plastic articles, wherein different radially spaced portions of the objects are to be severed, comprising:
   a rotary turntable having object support means thereon movable in a circumferential path of travel when the turntable is rotated;
   a plurality of trimming means circumferentially spaced about the periphery of said turntable at a plurality of circumferentially spaced trimming stations for severing different radially spaced portions of an object moved thereto when the turntable is rotated;

means for intermittently indexing said turntable to sequentially position said object support means and said object supported thereon at said circumferentially spaced trimming stations and temporarily holding the turntable stationary while the object is being trimmed;

means mounting said trimming means at said trimming stations for movement in generally tangential, radially spaced, paths of travel between removed, inoperative positions and object trimming positions, when the turntable and the workpieces thereon are stationary; and means for moving said plurality of trimming means between said inoperative and object trimming positions in said generally tangential paths of travel relative to said circumferential path of travel to cut different radially spaced, portions of the object at the respective stations when said turntable is stationary.

2. Apparatus as set forth in claim 1 wherein said object support means comprises a series of circumferentially spaced object support members for supporting an object at each of said trimming stations when the turntable is stationary; said moving means includes means for simultaneously moving said plurality of trimming means between their remote inoperative positions and operative positions for simultaneously severing different portions of the objects positioned at the respective stations.

3. Apparatus as set forth in claim 2 wherein each of said trimming means comprises a power driven saw member mounted on a swingably mounted load supporting arm; and said moving means comprises means for swinging each of said arms in a generally tangential path of travel relative to said circumferential path of travel.

4. Apparatus as set forth in claim 1 wherein said indexing means includes first and second motor means; said first motor means being operative, when driven, to drivingly couple said second motor means and said turntable for rotating said turntable when said second motor is driven in a first direction; said first motor means being operative to decouple said second motor means and said turntable to permit said second motor means to return when it is driven in an opposite direction.

5. Apparatus as set forth in claim 4 wherein said indexing means comprises a ratchet connected to said turntable and a pawl movable into and out of engagement with said ratchet; said first motor means moving said pawl into and out of engagement with said ratchet; and said second motor means being operatively coupled to said pawl for advancing said pawl when engaged with said ratchet to rotate said turntable and for returning said pawl when said pawl and ratchet are disengaged.

6. Apparatus as set forth in claim 5 including means pivotally connected with said turntable for supporting said pawl, said pawl being mounted on said pawl support means for swinging movement between the engaged and disengaged positions; said first motor means being connected to said pawl, said second motor means being connected to said pawl support means.

7. Apparatus for trimming workpieces, such as hollow plastic articles, comprising:

a rotary turntable having a series of circumferentially spaced workpiece support means thereon, movable in a circumferential path of travel when the turntable is rotated;

a plurality of workpiece trimming means generally circumferentially spaced about the periphery of said turntable at a plurality of circumferentially spaced trimming stations for trimming different portions of the workpieces after they are moved thereto as said turntable is rotated;

means for intermittently indexing said turntable to sequentially position said workpieces at said circumferentially displaced trimming stations and temporarily holding the turntable stationary while the workpieces are being trimmed;

support arms at said trimming stations swingably mounting said plurality of workpiece trimming means for movement between removed inoperative positions and operative workpiece trimming positions when the turntable and workpieces thereon are stationary; and means for moving said support arms to swing said plurality of workpiece trimming means between said inoperative and operative positions.

8. Apparatus as set forth in claim 7 wherein said support arm moving means comprises means for simultaneously moving all of said workpiece trimming means between said inoperative and operative positions.

9. Apparatus as set forth in claim 7 wherein said indexing means includes first and second motor means, said first motor means being operatively connected with said second motor means for swinging said second motor means between a first locked position drivingly connected with said turntable for rotating said turntable when the second motor means is moved a first direction, and a retracted unlocked position permitting the escape of said second motor means when said second motor means is moved in an opposite direction.

10. Apparatus as set forth in claim 9 including means operative in response to said workpiece support means being positioned at said trimming stations for locking said turntable in position when said second motor means is moving in said opposite direction and said trimming means are moving between said inoperative and operative positions.

11. Apparatus as set forth in claim 8 wherein said support arms are substantially universally movable to provide for fine adjustment and accurate positioning of each of said trimming means in any of a plurality of preselected position.

12. Apparatus as set forth in claim 7 wherein at least one of said trimming means is movable in a tangential path of travel relative to said circumferential path of travel when the support arm associated therewith is swung between said inoperative and operative positions.

13. Apparatus as set forth in claim 12 including suction creating means including suction chambers adjacent each of said trimming stations for removing the scrap severed from the workpieces at the trimming stations to a remote location; and deflector guards adjacent at least one of said article support means for deflecting scrap material severed by said trimming means toward the adjacent suction creating chamber.

14. Apparatus as set forth in claim 12 including a loading station upstream of said trimming stations at which workpieces are positioned on said workpiece holding means; an unloading station downstream of said trimming station at which trimmed workpieces are removed from said workpiece support means; clamp means movable between unclamped positions at the workpiece loading and unloading stations and clamped positions at said trimming stations for clamping said workpieces to said workpiece support means; means responsive to rotation of said turntable for moving said clamping means between said clamped and unclamped positions.

15. Apparatus as set forth in claim 7 wherein one of said trimming means includes a pair of saw members mounted on individual support arms at a sawing station for movement between radially inner and outer positions for severing opposite end portions of a workpiece positioned at said sawing station.

16. Apparatus as set forth in claim 15 wherein said support moving means comprises means for simultaneously moving said saw members between said radially inner and outer positions in opposite directions toward and away from each other.

* * * * *

UNITED STATES PATENT OFFICE
CERTIFICATE OF CORRECTION

Patent No. 3,810,405        Dated May 14, 1974

Inventor(s) John W. Oberloier

It is certified that error appears in the above-identified patent and that said Letters Patent are hereby corrected as shown below:

Column 9, line 16, after "each" change "station" to -- suction --.

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,810,405     Dated May 14, 1974

Inventor(s) John W. Oberloier

It is certified that error appears in the above-identified patent and that said Letters Patent are hereby corrected as shown below:

The inventor's address should read -- 4176 W. Lyle Road, Beaverton, Mich. 48612 --.

Signed and sealed this 24th day of December 1974.

(SEAL)
Attest:

McCOY M. GIBSON JR.            C. MARSHALL DANN
Attesting Officer              Commissioner of Patents